(12) United States Patent
Hiipakka et al.

(10) Patent No.: US 7,363,095 B2
(45) Date of Patent: Apr. 22, 2008

(54) AUDIO PROCESSING SYSTEM

(75) Inventors: Jarmo Hiipakka, Espoo (FI); Samu Kaajas, Espoo (FI)

(73) Assignee: Nokia Corporation, Espoo (FI)

( * ) Notice: Subject to any disclaimer, the term of this patent is extended or adjusted under 35 U.S.C. 154(b) by 238 days.

(21) Appl. No.: 10/537,931

(22) PCT Filed: Oct. 8, 2003

(86) PCT No.: PCT/IB03/04421

§ 371 (c)(1),
(2), (4) Date: Jun. 7, 2005

(87) PCT Pub. No.: WO2005/036396

PCT Pub. Date: Apr. 21, 2005

(65) Prior Publication Data

US 2006/0015196 A1  Jan. 19, 2006

(51) Int. Cl.
*G06F 17/00* (2006.01)
(52) U.S. Cl. .......................................... 700/94; 712/28
(58) Field of Classification Search .................. 700/94; 712/28, 30, 31, 34, 35
See application file for complete search history.

(56) References Cited

U.S. PATENT DOCUMENTS 5,828,881 A   10/1998  Wang
6,009,507 A   12/1999  Brooks et al.
6,216,216 B1   4/2001  Bonola
6,301,603 B1  10/2001  Maher et al.
6,564,179 B1 *  5/2003  Belhaj .......................... 712/31
2003/0017808 A1  1/2003  Adams

OTHER PUBLICATIONS

"Design of Low Latency Audio Software for General Purpose Operating Systems," University of Turku, Department of Information Technology, Computer Science, Master's Thesis, Kai Vehmanen, Dec. 2002.

* cited by examiner

*Primary Examiner*—Sinh Tran
*Assistant Examiner*—Walter F Briney, III
(74) *Attorney, Agent, or Firm*—Alfred A. Fressola; Ware, Fressola, Van Der Sluys & Adolphson, LLP

(57) ABSTRACT

The invention relates to an audio processing system 1. In order to improve the audio processing, the system comprises at least one audio processing component 11, 12, 13 with a group of real-time functions 14 for processing audio data and a group of control functions 15 for processing control signals. The system further comprises at least one processor 16 providing a first process 20 for executing real-time functions 14 of the at least one audio processing component 11, 12, 13 using a basically constant processing power and at least one further process 30 for executing control functions 15 of the at least one audio processing component 11, 12, 13 when needed without affecting the processing power employed for the first process 20. The invention relates equally to a corresponding method and to a corresponding software program product.

18 Claims, 4 Drawing Sheets

AUDIO PROCESSING SYSTEM

CROSS REFERENCE TO RELATED APPLICATIONS

This application is for entry into the U.S. national phase under §371 for International Application No. PCT/IB03/004421 having an international filing date of Oct. 8, 2003, and from which priority is claimed under all applicable sections of Title 35 of the United States Code including, but not limited to, Sections 120, 363 and 365(c).

FIELD OF THE INVENTION

The invention relates to an audio processing system, to a method of operating an audio processing system and to a software program product with a software code which can be executed in an audio processing system.

BACKGROUND OF THE INVENTION

Audio processing systems are known from the state of the art in various forms, for example for a playback of MIDI files or for computer games.

Audio processing is very time-critical by nature. An audio subsystem typically produces a block of audio samples while simultaneously playing out a previously produced block. If the processing or generation of a new block takes more time than playing out one block, then a gap referred to as "drop-out" can be heard in the audio playback. In order to avoid such a gap, it is possible to queue up more than one produced block for playback in a buffer.

Interactive audio applications require in addition a low latency between an interaction event and the response in the audio playback. This can be achieved in principle with short audio frames. A large buffer size for avoiding gaps, however, will lead to an added latency between a possible user input and the resulting audio output, as the user input can only have influence on the blocks which are still to be produced.

Further, an interaction event can happen any time during the lifetime of the application and often requires additional processing. While an interaction is processed, the generation of new output blocks may be slowed down. It is thus a difficult task to find the shortest possible buffer size which results in a low latency but which does not produce audible gaps in any usage situation.

User inputs also result in a very uneven distribution of the total processing load as a function of time. The software design for a Digital Signal Processor (DSP) taking care of the processing is more complicated if varying loads have to be dealt with.

There are several audio processing software systems, in which at least a part of the processing is split up into units that conform to a unified interface, irrespective of the nature of the processing. These units are also referred to as components. A component is thus a building block for a software system framework and implements an audio processing feature, such as a mixer, a sampling rate converter, or a reverberation effect. The components can usually be plugged in the system without recompilation, and are hence called "plug-ins". Two of such systems are the VST (Virtual Studio Technology) API (Application Programmer Interface) by Steinberg, and the LADSPA (Linux Audio Developer's Simple Plugin API) by the Linux audio community.

The Steinberg VST plug-in architecture enables an integration of virtual effect processors and instruments into the digital audio system, for example of a VST mixer. The audio system can be run on a PC or on a Macintosh computer.

The LADSPA is an open Linux activity that provides a standard way for plug-in audio processors which are to be used with Linux audio synthesis and recording software.

In both solutions, the control calculations for interactions and the real-time signal processing calculations are carried out in the same process. This means that the total load of the audio processing varies according to the user interaction.

In the document "Design of Low Latency Audio Software for General Purpose Operating Systems", University of Turku, Department of Information Technology, Computer Science Master's Thesis of December 2002 by Kai Vehmanen, it is proposed to separate the audio processing code into real-time and non-real-time parts and to use a real-time safe mechanism for designing low latency audio applications. It is further proposed to use separate execution contexts for the user interface and the audio code, for instance multiple threads. A thread is a special case of a process. Each thread has its own execution context that can be independently scheduled, like other processes, but threads of one logical group have a shared memory space.

SUMMARY OF THE INVENTION

It is an object of the invention to further improve the processing in an audio processing system.

An audio processing system is proposed which comprises at least one audio processing component with a group of real-time functions for processing audio data and a group of control functions for processing control signals. The proposed audio processing system further comprises at least one processor providing a first process for executing real-time functions of the at least one audio processing component using a basically constant processing power. The processor provides in addition at least one further process for executing control functions of the at least one audio processing component whenever needed without affecting the processing power employed for the first process.

Moreover, a method of operating an audio processing system is proposed, the audio processing system comprising at least one audio processing component with a group of real-time functions for processing audio data and a group of control functions for processing control signals. The proposed method comprises executing the real-time functions of the at least one audio processing component with a basically constant processing power using a first process. The proposed method moreover comprises executing the control functions of the at least one audio processing component when needed using at least one further process without affecting the processing power employed for the first process. It is to be noted that while the real-time functions and the control functions can be executed basically in parallel, in some cases, the control functions could also be executed at least partly beforehand.

Finally, a software program product is proposed which comprises a software code for an audio processing component. The software code defines real-time functions for processing audio data when said software code is executed by a process of a processor, and it further defines control functions for processing control signals when the software code is executed by a process of a processor. The real-time functions are defined to be executed by a first process and the control functions are defined to be executed by at least one further process of at least one processor. The real-time functions moreover ensure that a constant amount of processing power per block of audio samples is taken from the at least one processor when the real-time functions are executed by the first process.

The invention proceeds from the consideration that the real-time functions should be provided with a constant processing power. It is therefore proposed that a dedicated process is provided for executing the real-time functions with a basically constant processing power. The control functions are executed exclusively with the processing power which is available for one or more further processes. The division between real-time data processing and control signal processing is realized more specifically separately for each component. Typically, each component corresponds to one algorithm.

It is an advantage of the invention that the processing load of the real-time part of the system can be kept constant regardless the amount of interaction. This is a significant improvement for the audio processing load management, because conventional systems had to prepare for the worst-case estimates or take the risk of drop-outs. The worst cases occur relatively seldom. If a conventional system is designed for being able to cope with the worst cases, most of the potential of the employed processor will be left unused most of the time.

It is moreover an advantage of the invention that it proposes a framework in which the division between real-time part and control part is internal to the respective component. This makes it easier to modify the division and the data running between the parts as needed, while providing all the benefits of the separation.

In addition, the software design for the first process is simplified, as stable, fixed processing load figures can be used.

Since the real-time functions are processed with a constant processing load, also the rate of generated audio blocks is basically constant. This facilitates as well the dimensioning of the buffer storing the audio blocks for presentation.

Preferred embodiments of the invention become apparent from the dependent claims.

If the audio processing system comprises several audio processing components, advantageously, an audio processing engine is employed for running the components sequentially.

Advantageously, all control events are time-stamped. The real-time process may then use the events in accordance with the time-stamps. If an application knows the interaction or control sequence beforehand, it can send the control events to the real-time process when it suits best. For example, it is possible to parse a MIDI file, extract all the control events, time-stamp them and send them to the real-time process even before the playback of the MIDI file has actually started.

The proposed audio processing system can be a single processor system or a multi-processor system.

In a single processor system, a software can be run in several execution threads. The control functions are executed in one or more threads, and the real-time functions are executed in a separate thread. The real-time functions and the control functions could also be executed in other processes than execution threads, though.

In such a single processor system, the operating system of the platform should be capable of guaranteeing sufficient resources for the real-time process, and run the control calculations only when the real-time process does not need the processor.

If the proposed system is a multi-processor system, the real-time functions are executed in a dedicated processor, while the control functions use at least one other processor. Such a multi-processor system is of particular advantage, as the real-time functions benefit from a dedicated processor, and the load balancing is particularly easily to realize.

The invention can be employed for processing audio data in any form, for example for linear pulse code modulation (PCM) domain audio data, for frequency domain audio data, for discrete cosine transform (DCT) domain audio data or for audio data coded in any other form.

BRIEF DESCRIPTION OF THE FIGURES

Other objects and features of the present invention will become apparent from the following detailed description considered in conjunction with the accompanying drawing.

DETAILED DESCRIPTION OF THE INVENTION

Figure 1:
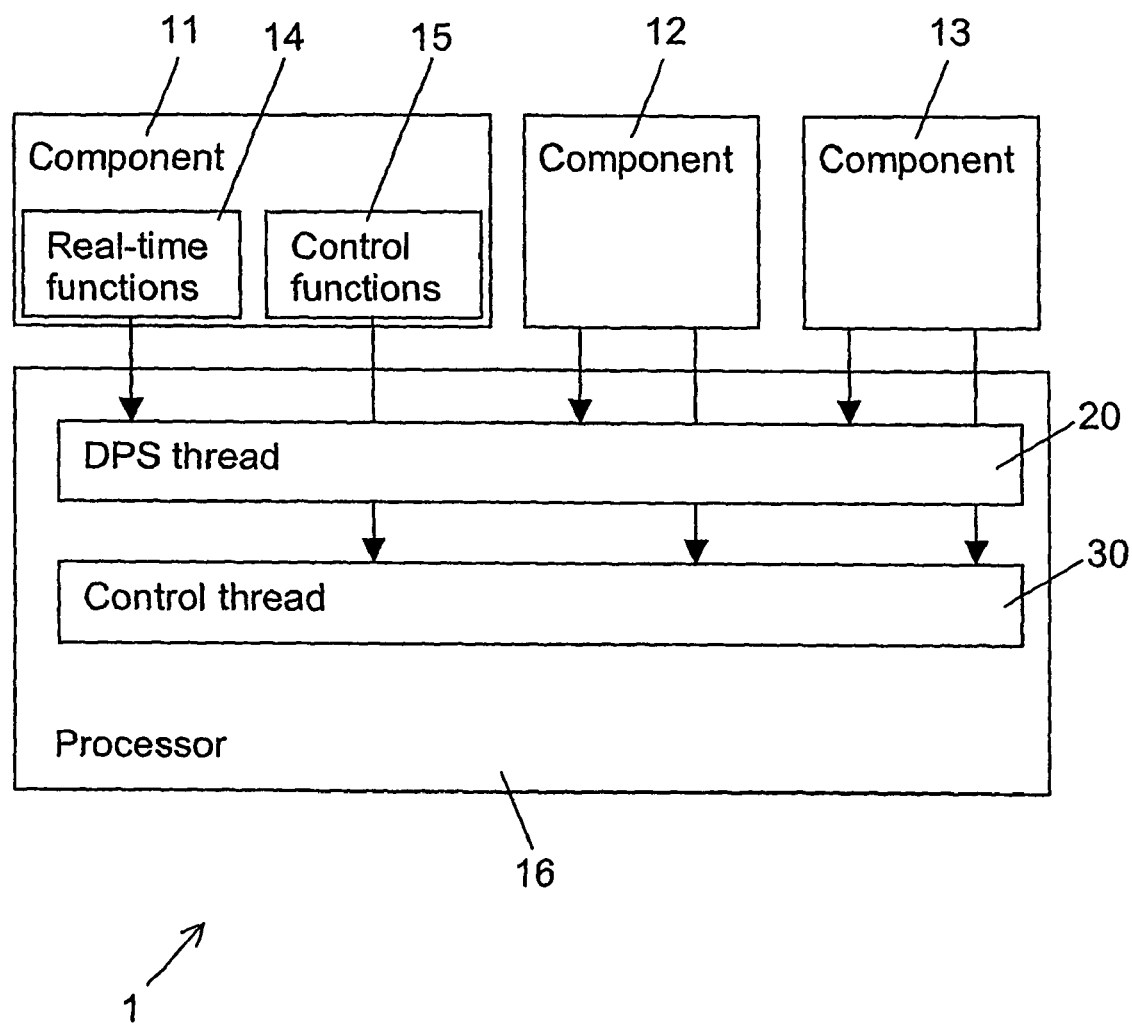
FIG. 1 is a schematic block diagram of an audio processing system according to the invention.

FIG. 1 is a schematic block diagram of an embodiment of an audio processing system 1 according to the invention.

The audio processing system 1 comprises a plurality of audio processing components 11, 12, 13. Each component 11, 12, 13 implements a different audio processing feature, such as a mixer, a sampling rate converter, or a reverberation effect. For the audio processing feature implemented by a respective component 11, 12, 13, the component 11, 12, 13 encapsulates an algorithm that can contain several basic signal-processing blocks, such as filters.

From a software design point of view, the components 11, 12, 13 are implemented using a single logical building block of the environment, for example using a C++ class. The components 11, 12, 13 can be either statically built, i.e., defined at compile-time, or they can be dynamically loadable plug-ins that can be connected to an already compiled and linked, i.e. an executable, software.

The feature implemented by a component 11, 12, 13 is based on various methods or functions. The functions in each component are split up into two groups, namely to real-time functions 14 and control functions 15, as indicated for one of the components 11. The real-time functions 14 take care of the processing of audio data by mixing, filtering, and otherwise dealing with input audio samples. The control functions 15 take care of controlling the real-time functions 14, for example based on a user input.

Each of the components 11, 12, 13 is connected to a processor 16, and within the processor 16 on the one hand to a DSP thread 20 and on the other hand to a control thread 30.

The real-time functions 14 of a component 11, 12, 13 are processed in the processor 16 by the DSP thread 20 with a constant processing load. The real-time functions 14 of the components 11, 12, 13 are therefore written such that they take a constant amount of processing power per block of audio samples. The design of the DSP thread 20 is simplified due to the guaranteed constant processing load.

The control functions 15 of a component 11, 12, 13 are processed in the processor 16 by the control thread 30. The control functions are executed only when needed, i.e., when there is an interaction or some other cause for a parameter change pending. The control thread 30 thus performs varying amount of processing depending on the user interaction and application controls without influencing the processing load for the real-time functions 14.

Figure 2:
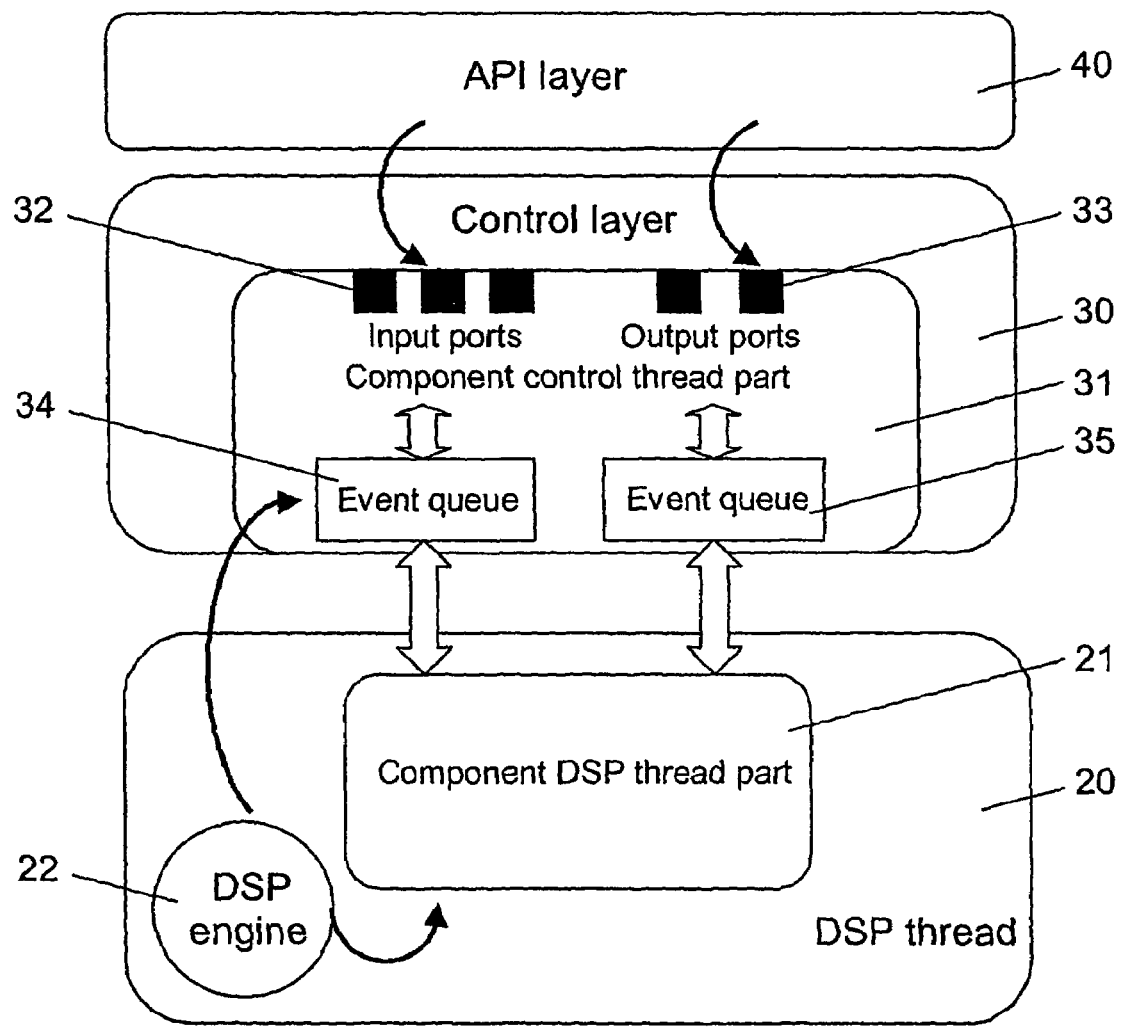
FIG. 2 is a schematic block diagram illustrating an implementation of the system of FIG. 1.

FIG. 2 is a block diagram of a layered structure illustrating the processing in the processor 16 of FIG. 1 in more detail.

The structure comprises an API layer 40, a control layer 30 corresponding to the control thread 30 of FIG. 1 and a DSP thread 20 corresponding to the DSP thread 20 of FIG. 1.

The control layer 30 provides a component control thread part 31 with input ports 32, output ports 33 and one or more event queues 34, 35. The component control thread part 31 is associated to one of the components 11 of FIG. 1. Similar component control thread parts (not shown) are provided by the control layer for each of the components 12, 13. The DSP thread 20 comprises a component DSP thread part 21 and a DSP engine 22 as audio processing engine.

The component DSP thread part 21 is used for running the real-time functions 14 of component 11 with a constant processing power.

At the same time, signals resulting from user interactions or other control occurrences are provided via the API layer 40 to the control layer 30, and more specifically via the input ports 32 to the component control thread part 31. Upon a user interaction or another control occurrences, the control functions 15 of the component 11 are executed in the component control thread part 31 and create events, which comprise new parameters for the real-time processing. All events are time-stamped sample accurately and inserted into the first event queue 34. The events are then provided from the queue to the component DSP thread part 21 of component 11 for providing the real-time processing with new parameters. It is also possible to give a future value to a timestamp, which allows to delay the impact of an event and thus of an interaction into the future.

The real-time functions 14 which are executed in the component DSP thread part 21 use the parameters provided with an event at the point of time indicated by the time-stamp. If the time-stamp of an event occurs in the middle of the audio frame length, the frame can be split up in the component DSP thread part 21 into two or more parts. The first part is then processed with the old parameters and the second part with the new ones. The frame splitting is only carried out for those components 11, 12, 13 which the respective interaction affects, other components remain unaffected.

The processing in the component control thread part 31 may result not only in events defining parameters for the real-time processing in the component DSP thread part 21, but also in events for a feedback to the user. In this case, corresponding events are input to the second event queue 35. Equally, the real-time processing in the component DSP thread part 35 may result in events with information which is, for example, to be presented to a user. Also these events are input to the second event queue 35. The events in the second event queue 35 are output via the output ports 33 of the component control thread part 31 and the API layer 40 to a user interface (not shown).

It has to be noted that the presented embodiment could also be realized, for example, with a single event queue, that is either with input event queue 34 or with output event queue 35. On the other hand, a plurality of event queues could be provided for the input and/or the output as well.

The DSP engine 22 connects the components 11, 12, 13 together to form a processing network.

Within the network, the DSP engine 22 causes the components 11, 12, 13 to be run sequentially by an associated component control thread part and an associated component DSP thread part, in the order defined by the needs of audio processing functionality. When the original audio data has been processed by all required components 11, 12, 13, the output of the last component may stored block by block to a buffer for presentation. There can also be special components, which contain several individual components in a hierarchical manner. These components can be called sub-engines.

Figure 3:
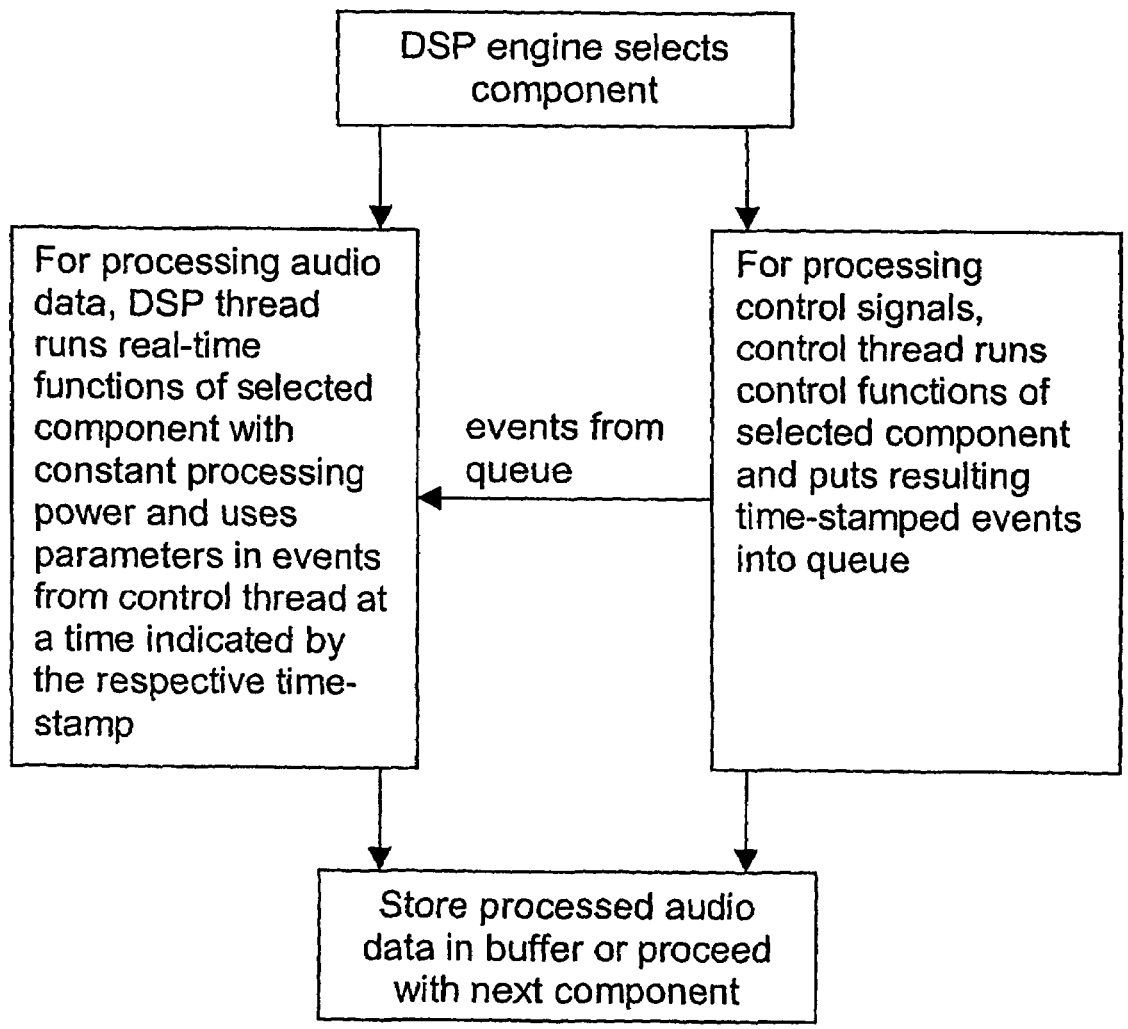
FIG. 3 is a flow chart illustrating the processing in the system of FIG. 1.

The operation in the audio processing system 1 of FIGS. 1 and 2 is summarized in the flow chart of FIG. 3.

When the DSP engine 22 selects a particular component 11, 12, 13 for execution, the audio data is processed in the corresponding component DSP thread part 21 with a constant processing power. In parallel, all control signals are processed in the corresponding component control thread part 31 whenever needed. The events generated based on the control signals are time-stamped and queued. The events in the queue 34 are provided in their input order to the component DSP thread part 21. The component DSP thread part 21 uses the parameters in the events for further processing the audio data starting from the point of time indicated by the respective time-stamp of an event. The processed audio data is provided for processing by a subsequent component 12, which is then selected by the DSP engine 22 for execution. If the current component constitutes the last one of the components 11, 12, 13, the processed audio data is provided as audio block to a buffer for presentation to a user.

A practical example for the application of the proposed approach is a 3D audio computer game. When a presented character in the computer game stands still, the control thread 20 does not perform much 3D calculation. When the character moves rapidly, the control thread 20 calculates parameter conversions from the 3D coordinates to a form which a 3D audio rendering algorithm accepts run in the DSP thread 20. In both cases, the amount of 3D calculations carried out in the DSP thread 20 is the same.

While the audio processing system 1 presented in FIGS. 1 to 3 is a single processor system using several threads, the processing could also be carried by other separate processes of a single processor system.

Figure 4:
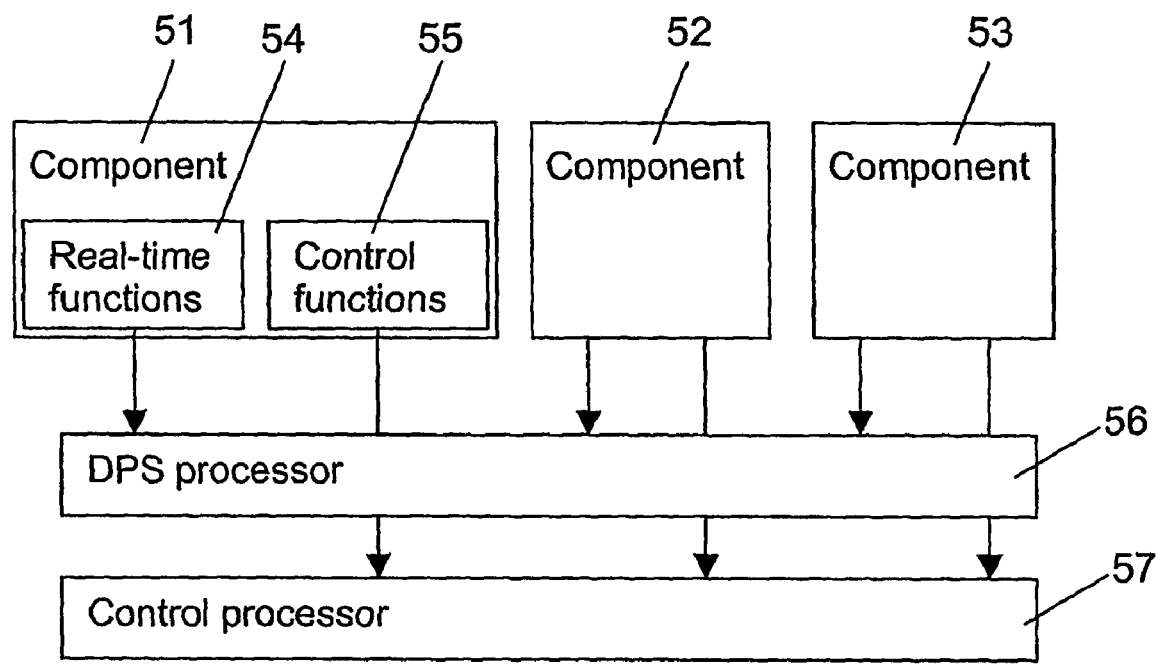
FIG. 4 is a schematic block diagram presenting a possible variation of the audio processing system of FIG. 1.

Further, the processing can be carried out advantageously in a multi-processor system in one or more processes. FIG. 4 presents such a multi-processor system 5. The system 5 comprises again a plurality of audio processing components 51, 52, 53, which correspond basically to the components 11, 12, 13 of FIG. 1. Each of the components 51, 52, 53 in FIG. 5, however, is connected on the one hand to a real-time processor 56 and on the other hand to a control processor 57. The real-time processor 56 is a dedicated processor for running the real-time functions 54 of the components 51, 52, 53 similarly as described above for the DSP thread 20, while the control processor 57 uses one or more processes for running the control functions 55 of the components 51, 52, 53 similarly as described above for the control thread 30.

It is to be understood that the described embodiments constitutes only one of a variety of possible embodiments of the invention.

The invention claimed is:

1. An audio processing system comprising:
   at least one audio processing component with a group of real-time functions configured to process audio data and a group of control functions configured to process control signals; and
   at least one processor configured to provide a first process for executing real-time functions of said at least one audio processing component using a basically constant processing power and at least one further process for executing control functions of said at least one audio processing component whenever needed without affecting the processing power employed for said first process.

2. The audio processing system according to claim 1, wherein said at least one audio processing component includes a plurality of audio processing components, said audio processing system further comprising an audio processing engine configured to select successively one of said audio processing components and to cause said at least one processor to execute real-time functions of the respectively selected audio processing component in a dedicated part of said first process and control functions of the respectively selected audio processing component in a dedicated part of said at least one further process.

3. The audio processing system according to claim 2, wherein said control functions are designed for generating events based on received control signals and for time-stamping said events, when said control functions are executed in said at least one further process, wherein said at least one further process is designed for providing said events to said first process, and wherein said real-time functions are designed for using said events at a time defined by said time stamps, when said real-time functions are executed in said first process.

4. The audio processing system according to claim 3, wherein said at least one processor is a single processor which is configured to provide said first process and said at least one further process.

5. The audio processing system according to claim 3, wherein said at least one processor comprises a first processor and at least a second processor, said first processor being configured to provide said first process and said second processor being configured to provide at least one of said at least one further process.

6. The audio processing system according to claim 5, wherein said first process and said at least one further process are execution threads.

7. The audio processing system according to claim 1, wherein said control functions are designed for generating events based on received control signals and for time-stamping said events, when said control functions are executed in said at least one further process, wherein said at least one further process is designed for providing said events to said first process, and wherein said real-time functions are designed for using said events at a time defined by said time stamps, when said real-time functions are executed in said first process.

8. The audio processing system according to claim 1, wherein said at least one processor is a single processor providing said first process and said at least one further process.

9. The audio processing system according to claim 1, wherein said at least one processor comprises a first processor and at least a second processor, said first processor providing said first process and said second processor providing at least one of said at least one further process.

10. The audio processing system according to claim 1, wherein said first process and said at least one further process are execution threads.

11. A method composing the steps of:
    executing real-time functions of at least one audio processing component with a basically constant processing power using a first process for processing audio data; and
    executing control functions of said at least one audio processing component whenever needed using at least one further process without affecting the processing power employed for said first process for processing control signals.

12. The method according to claim 11, wherein said at least one audio processing component includes a plurality of audio processing components, said method further comprising selecting successively one of said audio processing components the real-time functions of the respectively selected audio processing component being executed in a dedicated part of said first process and the control functions of the respectively selected audio processing component being executed in a dedicated part of said at least one further process.

13. The method according to claim 12, wherein executing said control functions in said at least one further process comprises generating events based on received control signals, time-stamping said events and providing said events to said first process, and wherein executing said real-time functions in said first process comprises making use of said events at a time selected based on said time stamps.

14. The method according to claim 11, wherein executing said control functions in said at least one further process comprises generating events based on received control signals, time-stamping said events and providing said events to said first process, and wherein executing said real-time functions in said first process comprises making use of said events at a time selected based on said time stamps.

15. A software program product comprising a software code, stored on a computer-readable medium, said software code defining real-time functions and control functions for at least one audio processing component, and said software code when executed by at least one processor causing said at least one processor:
    to execute said real-time functions by a first process of said at least one processor with a basically constant processing power for processing audio data; and
    to execute said control functions by at least one further process of said at least one processor whenever needed for processing control signals without affecting the processing power employed for said first process.

16. Software program product according to claim 15, wherein said at least one audio processing component includes a plurality of audio processing components, said software code when executed by said at least one processor causing said at least one processor to select said audio processing components successively, and to execute the real-time functions of the respectively selected audio processing component in a dedicated part of said first process and to execute the control functions of the respectively selected audio processing component in a dedicated part of said at least one further process.

17. Software program product according to claim 15, wherein executing said control functions in said at least one further process comprises generating events based on received control signals, time-stamping said events and providing said events to said first process, and wherein executing said real-time functions in said first process comprises making use of said events at a time selected based on said time stamps.

18. An apparatus comprising:
- means for defining at least one audio processing component with a group of real-time functions for processing audio data and a group of control functions for processing control signals; and
- means for providing a first process for executing real-time functions of said at least one audio processing component using a basically constant processing power and at least one further process for executing control functions of said at least one audio processing component whenever needed without affecting the processing power employed for said first process.

* * * * *